United States Patent
Liu et al.

(10) Patent No.: US 11,113,450 B2
(45) Date of Patent: Sep. 7, 2021

(54) COGNITIVE FONT ENRICHMENT MANAGEMENT FOR ADDING SYSTEM FONTS

(71) Applicant: International Business Machines Corporation, Armonk, NY (US)

(72) Inventors: Su Liu, Austin, TX (US); Boyi Tzen, Taipei (TW); Fan Yang, Beijing (CN); Syed I. Haiderzaidi, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 16 days.

(21) Appl. No.: 16/171,888

(22) Filed: Oct. 26, 2018

(65) Prior Publication Data

US 2020/0134000 A1   Apr. 30, 2020

(51) Int. Cl.
  *G06F 40/109*   (2020.01)
  *H04L 29/08*   (2006.01)
  *G06F 16/955*   (2019.01)

(52) U.S. Cl.
  CPC .......... *G06F 40/109* (2020.01); *G06F 16/955* (2019.01); *H04L 67/22* (2013.01)

(58) Field of Classification Search
  CPC ....... G06F 16/955; G06F 40/109; H04L 67/22
  See application file for complete search history.

(56) References Cited

U.S. PATENT DOCUMENTS

| | | | |
|---|---|---|---|
| 7,197,706 B1 | 3/2007 | Berson et al. | |
| 8,134,720 B2 | 3/2012 | Hodder et al. | |
| 8,683,006 B2 | 3/2014 | Veen et al. | |
| 9,483,445 B1* | 11/2016 | Joshi | G06F 40/106 |
| 9,547,629 B2 | 1/2017 | Konnola et al. | |
| 9,727,537 B2 | 8/2017 | Hsu et al. | |
| 9,940,744 B2 | 4/2018 | Borson et al. | |
| 9,959,487 B2 | 5/2018 | Gao et al. | |
| 10,007,868 B2 | 6/2018 | Jin et al. | |

(Continued)

FOREIGN PATENT DOCUMENTS

| | | | |
|---|---|---|---|
| KR | 20060131299 A | 12/2006 | |
| KR | 20130126459 A | 11/2013 | |

OTHER PUBLICATIONS

Adobe, "Distiller Font Management", Adobe Systems, Sep. 14, 2000, pp. 1-46.

(Continued)

*Primary Examiner* — Kyle R Stork
(74) *Attorney, Agent, or Firm* — Kunzler Bean & Adamson (57) ABSTRACT

Methods and systems for cognitive font enrichment management for adding system fonts are provided. A system for providing cognitive font enrichment management for adding system fonts includes a monitoring module that monitors web font operations. The system also includes a font conversion module that identifies a web font associated with a new glyph that is not described in a local system font repository and converts the identified web font associated with the new glyph into a default system font format. Further, the system includes a validation module that validates the converted web font associated with the new glyph. Additionally, the system includes an update module that updates the local system font repository with the validated converted web font associated with the new glyph.

20 Claims, 5 Drawing Sheets

(56) References Cited

U.S. PATENT DOCUMENTS

| | | | |
|---|---|---|---|
| 2008/0306916 A1* | 12/2008 | Gonzalez | G06F 16/93 |
| 2010/0218086 A1 | 8/2010 | Howell et al. | |
| 2012/0016964 A1 | 1/2012 | Veen et al. | |
| 2015/0154152 A1* | 6/2015 | Konnola | G06F 40/109 |
| | | | 715/269 |
| 2015/0161082 A1 | 6/2015 | Levien et al. | |
| 2017/0004113 A1 | 1/2017 | Gore et al. | |
| 2017/0249286 A1 | 8/2017 | Kaplan et al. | |
| 2017/0255597 A1* | 9/2017 | Sinn | G06F 40/109 |
| 2018/0082156 A1* | 3/2018 | Jin | G06N 3/0454 |
| 2018/0114097 A1 | 4/2018 | Wang et al. | |
| 2019/0155872 A1* | 5/2019 | Patel | G06F 40/109 |

OTHER PUBLICATIONS

R. Brath et al., "Font attributes enrich knowledge maps and information retrieval Font attributes enrich knowledge maps and information retrieval", Int J Digit Libr, Springerlink.com, Feb. 8, 2016, pp. 1-20.
C. Xiao et al., "FontCode: Embedding Information in Text Documents using Glyph Perturbation", ACM Transactions on Graphics, vol. 1, No. 1, Article 1, Jan. 2016, pp. 1-15.
Karel Piska, "Fonts with complex OpenType tables", Institute of Physics of The ASCR, v. v. i., Aug. 30, 2010, pp. 101-115.
Github, "A Library for Using, Editing, and Creating SFNT-based Fonts", https://github.com/jaredrummler/sfntly, Apr. 9, 2016, pp. 1-2.

* cited by examiner

COGNITIVE FONT ENRICHMENT MANAGEMENT FOR ADDING SYSTEM FONTS

FIELD

This invention relates to font management and more particularly relates to methods and systems for cognitive font enrichment management for adding system fonts.

BACKGROUND

When a user accesses a website, a user has a reasonable expectation of engaging with the information presented on the website in a comfortable manner. As part of the presentation of a website to a user, a website developer may specify a particular font and other characteristics related to website presentation. When a user's computing device accesses the website, the user's computing device may interpret the specified presentation information for the website and present the website for consumption by the user based on data that is available to the user's computing device.

SUMMARY

Methods and systems for cognitive font enrichment management for adding system fonts are provided. A system for providing cognitive font enrichment management for adding system fonts includes a monitoring module that monitors web font operations. The system also includes a font conversion module that identifies a web font associated with a new glyph that is not described in a local system font repository and converts the identified web font associated with the new glyph into a default system font format. Further, the system includes a validation module that validates the converted web font associated with the new glyph. Additionally, the system includes an update module that updates the local system font repository with the validated converted web font associated with the new glyph.

In certain embodiments, the web font comprises font information that describes one or more fonts or one or more glyphs. Additionally, the monitoring module includes a font usage tracker module that tracks the use of fonts by a user. Further, the font usage tracker module tracks the use of fonts at the system level and the application level. Also, the font usage tracker module detects unavailable fonts associated with unavailable glyphs, wherein an unavailable font is a local system font that is unloadable by an application.

In further embodiments, the validation module includes a font availability analyzer module that analyzes the availability of local system font information within the local system font repository. Also, the validation module includes a font classifier module that classifies the font information into one or more groups based on characteristics of the font information. Additionally, the update module includes a font list synchronizer module that synchronizes the font information in the local system font repository with an available font list. Further, the system includes a cognitive font enrichment manager data structure for monitoring one or more web fonts.

One method includes monitoring web font operations. The method also includes identifying a web font associated with a new glyph that is not described in a local system font repository. Further, the method includes converting the identified web font associated with the new glyph into a default system font format. Additionally, the method includes validating the converted web font associated with the new glyph. Also, the method includes updating the local system font repository with the validated converted web font associated with the new glyph.

In certain embodiments, the web font comprises font information that describes one or more fonts or one or more glyphs. Additionally, monitoring web font operations further includes tracking the use of fonts by a user. Further, tracking the use of fonts further includes tracking the use of fonts at the system level and the application level. Also, tracking the use of fonts further includes detecting unavailable fonts associated with unavailable glyphs, wherein an unavailable font is a local system font that is unloadable by an application.

In additional embodiments, validating the converted web font further includes analyzing the availability of local system font information within the local system font repository. Further, validating the converted web font further includes classifying the font information into one or more groups based on characteristics of the font information. Additionally, updating the local system font repository further includes synchronizing the font information in the local system font repository with an available font list. Also, the method includes monitoring one or more web fonts with a cognitive font enrichment manager data structure.

Also, disclosed are computer program products including a computer-readable storage medium that includes program instructions embodied therewith for cognitive font enrichment management for adding system fonts. Some program instructions executable by a processor cause the processor to monitor web font operations. Further, the program instructions cause the processor to identify a web font associated with a new glyph that is not described in a local system font repository. Additionally, the program instructions cause the processor to convert the identified web font associated with the new glyph into a default system font format. Also, the program instructions cause the processor to validate the converted web font. The program instructions further cause the processor to update the local system font repository with the validated converted web font.

In additional embodiments, the program instructions executable by a processor further cause the processor to track the use of fonts by a user at the system level and the application level. Additionally, the program instructions executable by a processor cause the processor to detect unavailable fonts, wherein an unavailable font is a font that is unloadable by an application.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION

Disclosed herein are various embodiments providing methods, systems, and computer program products that can provide cognitive font enrichment management for adding system fonts. Notably, the language used in the present disclosure has been principally selected for readability and instructional purposes, and not to limit the scope of the subject matter disclosed herein in any manner.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

These features and advantages of the embodiments will become more fully apparent from the following description and appended claims or may be learned by the practice of embodiments as set forth hereinafter. As will be appreciated by one skilled in the art, aspects of the present invention may be embodied as a system, method, and/or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer readable medium(s) having program code embodied thereon.

Many of the functional units described in this specification have been labeled as modules, to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of program code may, for instance, comprise one or more physical or logical blocks of computer instructions which may, for instance, be organized as an object, procedure, or function. Nevertheless, the executables of an identified module need not be physically located together but may comprise disparate instructions stored in different locations which, when joined logically together, comprise the module and achieve the stated purpose for the module.

Indeed, a module of program code may be a single instruction, or many instructions, and may even be distributed over several different code segments, among different programs, and across several storage devices. Similarly, operational data may be identified and illustrated herein within modules and may be embodied in any suitable form and organized within any suitable type of data structure. The operational data may be collected as a single data set or may be distributed over different locations including over different storage devices, and may exist, at least partially, merely as electronic signals on a system or network. Where a module or portions of a module are implemented in software, the program code may be stored and/or propagated on in one or more computer readable medium(s).

The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory ("RAM"), a read-only memory ("ROM"), an erasable programmable read-only memory ("EPROM" or Flash memory), a static random access memory ("SRAM"), a portable compact disc read-only memory ("CD-ROM"), a digital versatile disk ("DVD"), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and computer program products according to various embodiments of the present invention. In this regard, each block in the schematic flowchart diagrams and/or schematic block diagrams may represent a module, segment, or portion of code, which comprises one or more executable instructions of the program code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and program code.

The description of elements in each figure below may refer to elements of proceeding figures. For instance, like numbers can refer to similar elements in all figures, including alternate embodiments of similar elements.

Figure 1:
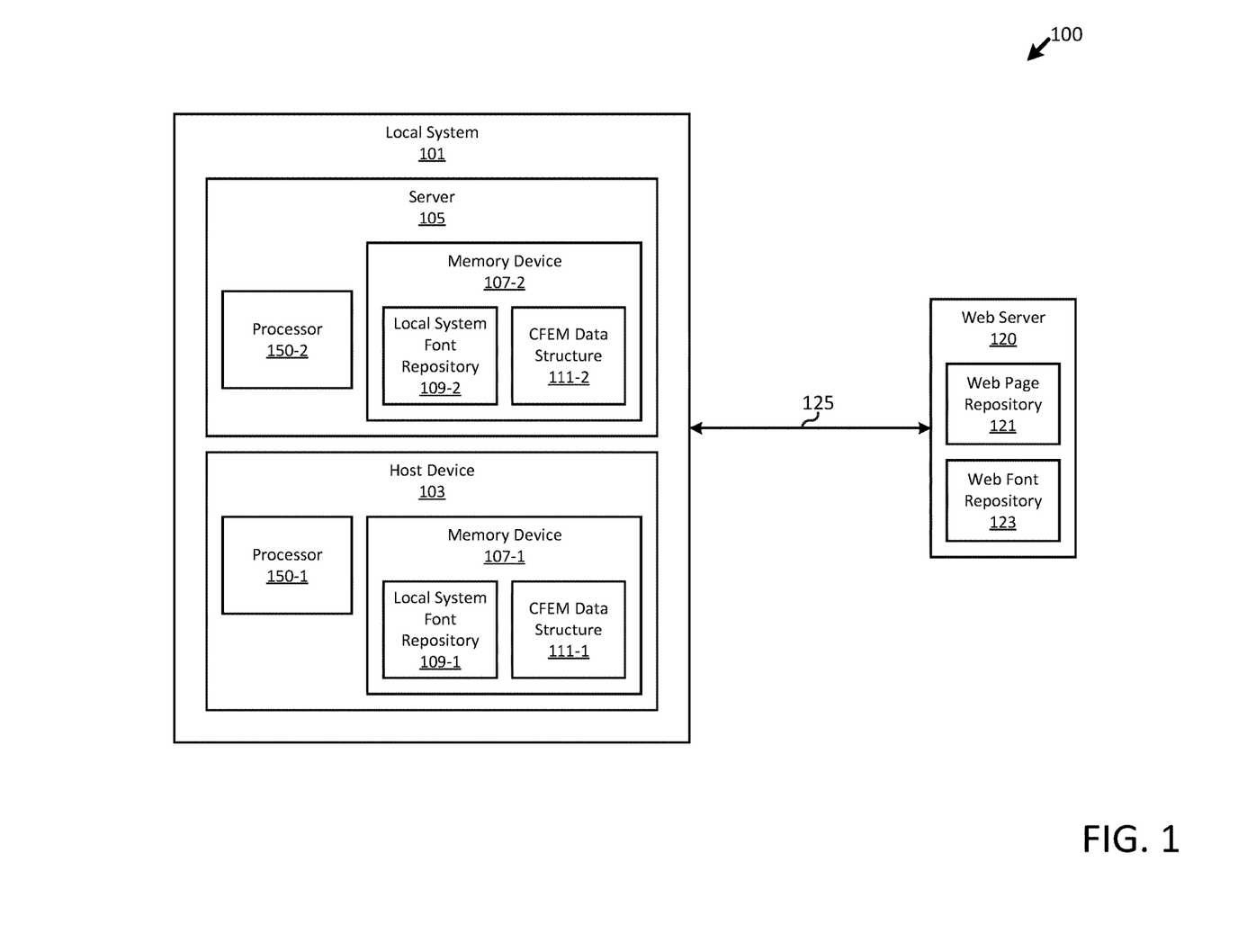
FIG. 1 is a block diagram of one embodiment of a computing system for cognitive font enrichment management for adding system fonts.

With reference now to the figures, FIG. 1 is a block diagram of one embodiment of a system 100 for cognitive font enrichment management that can add system fonts during run time. In at least one implementation, the system 100 includes a local system 101 that communicates with a web server 120 over an internet connection 125. As described herein, the web server 120 may be any computing device that stores web information and provides the web information to other computing devices (such as the computing devices in the local system 101). The web information may include web sites and information that may be used by the local system 101 to present web pages to a user of a computing device in the local system 101.

In some embodiments, as part of providing the web information to the local system 101, the web server 120 may store data related to the presentation of web pages. For example, the web server 120 may include a web page repository 121 and a web font repository 123. As described herein, the web page repository 121 may be a data structure that stores web page information such that the web page information may be provided from the web server 120. Also, as described herein, the web font repository 123 may be a data structure that stores web font information. Web font information includes information that specifies the manner of displaying fonts and other visible web elements such as glyphs to a user. As used herein, a font may refer to a graphical representation of text, where a font may specify a typeface, a point size, weight, color, or other design element. Further, as used herein, a glyph may refer to a graphical representation of a symbol. Also, web font information may include fonts that are not installed on a user's computing device. To store the web information, the web server 120 may maintain the web page repository 121 and web font repository 123 in one or more storage devices.

In further embodiments, the storage devices within the web server 120 may include any suitable type of storage device or cluster of storage devices that are known or developed in the future that can store computer-usable data. In various embodiments, the storage devices may include one or more non-transitory computer-usable mediums (e.g., readable, writable, etc.), which may include any non-transitory apparatus or device that can contain, store, communicate, propagate, and/or transport instructions, data, computer programs, software, code, routines, etc., for processing by or in connection as directed by the respective site controller.

In certain embodiments, memory storage on the storage devices may be implemented as a direct-access storage devices (DASD). The memory storage, in further embodiments, may include non-transitory memory such as, for example, flash memory (e.g., a solid-state device (SSD) or other non-volatile storage devices that store persistent data), a dynamic random access memory (DRAM) device, an enhanced dynamic random access memory (EDRAM) device, a static random access memory (SRAM) device, a hard disk drive (HDD), a near-line drive, tape drive (e.g., magnetic and/or virtual), and/or other type(s) (e.g., non-volatile and/or persistent) of memory devices, etc. that are possible and contemplated herein. In some embodiments, the storage devices may include a cluster of separate storage devices that are configured to store data. For example, the memory storage may be a network file system, a parallel file system, or other type of file system where multiple computing devices access the memory storage.

In various embodiments, the storage devices may include non-volatile/persistent hardware and/or software configured to perform long-term data storage operations, including, but not limited to, data archiving, data backup, data mirroring, replicating data, etc. For instance, the storage devices may include non-volatile and/or persistent hardware and/or software to perform long-term data storage operations, which may include write operations, read operations, read-write operations, etc., among other operations.

In certain embodiments, the local system 101 may receive web information from the web server 120 over the internet connection 125 and displays the web information received from the web server 120 to a user. The local system 101 may include one or more computing devices that receive web information from the web server 120. For example, the local system 101 may include a server 105 and one or more host devices 103. The server 105 may be a computing device that controls a network containing the one or more host devices 103. The host device 103 may be a computing device that is associated with a user. As shown, the server 105 and the host device 103 may each include a processor 150. For example, the server 105 may include a processor 150-2 and the host device 103 may include a processor 150-1. As used herein, a processor 150 may be a device for executing computer readable instructions.

In additional embodiments, the server 105 and the host device 103 may each include a memory device 107. For example, the server 105 may include a memory device 107-2 and the host device 103 may include a memory device 107-1. The memory devices 107 may be storage devices that function similar to the storage devices described above with respect to the web server 120. Also, the memory device 107 may be on the server 105, one or more host devices 103, or distributed between the server 105 and the one or more host devices 103.

In certain embodiments, the local system 101 may receive the web information from the web server 120. The local system 101 may then provide the web information for display to the user. As part of the web information to be displayed, the local system 101 may present fonts and glyphs associated with the web information. When deciding to display a font, a web site developer may desire that the fonts be readable and usable such that the fonts do not distract and impede customer engagement with the information presented in the web information. However, the fonts specified in the web page may not be available for use on a user's system. When a font is not available on a user's system, the user's system may use default system fonts. When a user's device implements system fonts, the text presented on a web page may be too small to read or too large to fit within the site. Also, default fonts may appear chaotic and disjointed. Further, the default fonts may not fit within or even clash with the theme of the web information. The problems with the fonts may negatively affect and even prevent people from accepting information.

In some embodiments, to help ensure that web information is properly displayed to a user, the memory device 107 may store data structures such as a local system font repository 109 and a cognitive font enrichment management (CFEM) data structure 111. As used herein, the local system font repository 109 refers to a central location for storing font information on the local system 101. Further, the local system font repository 109 may be distributed through the local system 101 and saved as local system font repository 109-1 on the memory device 107-1 and as local system font repository 109-2 on the memory device 107-2. Also, as used herein, the CFEM data structure 111 may refer to a data structure for monitoring and tracking web font usages. The CFEM data structure 111 may be distributed between the host device 103 and the server 105. For example, the CFEM data structure 111 may exist as CFEM data structure 111-1 on the memory device 107-1 and CFEM data structure 111-2 on the memory device 107-2.

In certain embodiments, the local system 101 may execute a web application that receives the web information from the web server 120. The local system 101 may analyze the availability of local system fonts and glyphs that are saved in the local system font repository 109. Additionally, the local system 101 may then classify the analyzed fonts in the local system font repository 109. Further, the local system 101 may synchronize an available font list and a correlated available glyphs table with newly updated fonts and/or glyphs.

In further embodiments, the local system 101 track font usage by a user at both system level and at an application level. Additionally, the local system 101 may detect unavailable fonts which a web application may attempt to load. Also, the local system 101 may detect unavailable glyphs in a loaded font. Further, the local system 101 may monitor web fonts at the application level and identify web fonts and/or glyphs which are not in the available font list and glyph table. The local system 101 may convert the identified font and glyphs into default system font formats and may validate the new converted font and glyphs. When the local system 101 has validated the new converted font and glyphs, the local system 101 may update the local system font repository 109 with the validated fonts and glyphs. Accordingly, the local system 101, by updating the local system font repository 109, may define a CFEM framework for proactively adding new fonts from web fonts during run time.

Figure 2:
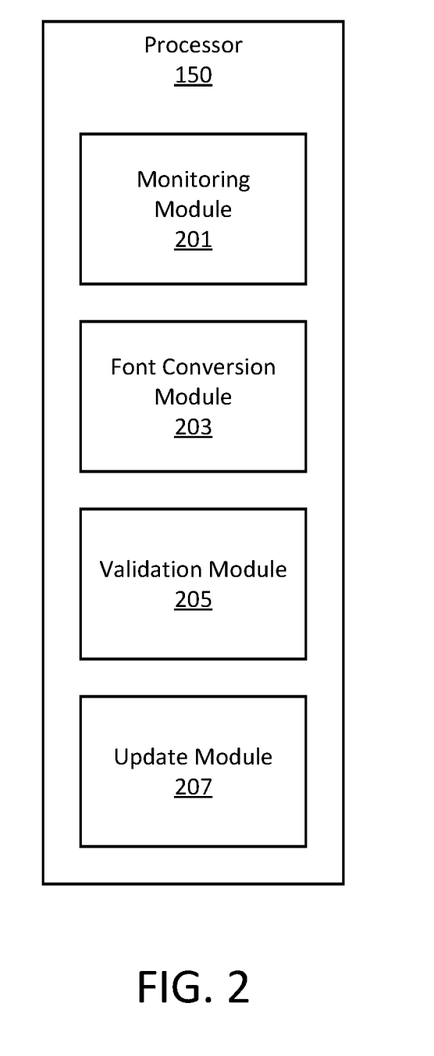
FIG. 2 is a block diagram illustrating an embodiment of a processor configured to provide cognitive font enrichment management for adding system fonts.

FIG. 2 is a block diagram illustrating an embodiment of a processor 150 for providing cognitive font enrichment management for adding system fonts. In certain embodiments, as used herein, the processor 150 may be a general purpose computer, special-purpose computer, multiple processors, or other programmable data processing apparatus. In some embodiments, the processor 150 may be one or more processors on the local system 101 capable of controlling computing devices such as the server 105 and host device 103 described above in FIG. 1. In the depicted embodiment, the processor 150 may include a monitoring module 201, a font conversion module 203, a validation module 205, and an update module 207. As described herein, the monitoring module 201 may monitor web font operations. Further, the font conversion module 203 may identify a web font that is not in a local system font repository 109 and converts the identified web font into a default system font format. Additionally, the validation module 205 may validate the converted web font. Also, the update module 207 may update the local system font repository 109 with the validated converted web font.

As described herein, a CFEM framework, implemented by the processor 150, may add new system fonts during run time. In some embodiments, the CFEM framework may be network based and executed by the server 105, but may also be performed in a host device 103. When the CFEM framework executes, the CFEM framework may improve local system fonts such that the display of information on the web sites is more easily consumed by a user accessing the information.

In certain embodiments, the monitoring module 201 may be an executable application or part of an executable application for monitoring web font operations at a web application level. For example, when the local system 101 receives web information from the web server 120 for display to the user, the processor 150 may execute a web application that receives the web information and performs web font operations such as displaying the font in a consumable format for a user. Further, the web font operations may include converting the web font, among other operations performed by the processor 150 on the received web font information. When the web application displays the web information, the monitoring module 201 may monitor web information. For example, the monitoring module 201 may maintain a web font list, where the web font list is a list of different web fonts. Further, when the monitoring module 201 identifies a web font in received web information, the monitoring module 201 may update the maintained web font list with a web font identifier or web font tag for the identified web font. The monitoring module 201 may also store the uniform resource locator (URL) address for the web site associated with the identified web font. Further, the monitoring module 201 may save an identifier for the web application. The CFEM framework may use the information gathered by the monitoring module 201 to display the web information to the web user.

In some embodiments, the font conversion module 203 may convert identified web fonts and glyphs into default system font formats. For example, the font conversion module 203 may acquire a web font identifier for the web font from the monitoring module 201 and use the acquired web font identifier to further acquire an identifier for a suggested system font. In some embodiments, the font conversion module 203 may store web font identifiers in a table where the separate web font identifiers for the web fonts are associated with suggested system font identifiers. Alternatively, the font conversion module 203 may identify characteristics of the web font such as typeface, point size, weight, color, or other design elements. Based on the identified characteristics of the web font, the font conversion module 203 may identify a default system font format that has sufficiently similar characteristics to the web font and convert the web font to the default system font format.

In further embodiments, the validation module 205 may validate a converted web font to verify that the converted font or glyphs can be loaded and/or used by a local system and/or any other local applications. For example, the validation module 205 may maintain a list of fonts that are compatible with a particular system such as the local system 101 or a local application such as a same or different web browser application displaying same or another web information acquired from a same or different web server 120. Alternatively, the validation module 205 may provide an identifier for the suggested system font to verify whether the suggested system font is loadable by one or both of the local system 101 or the application associated with the new converted web font.

In additional embodiments, the update module 207 may update the local system font repository 109 with the validated converted web font. For example, update module 207 may store identifiers associated with the web font and the suggested system font associated with the web font into the local system font repository 109 stored on the host device 103, the server 105, or distributed between the host device 103 and the server 105. Further, the update module 207 may update the local system font repository 109 with suggested system glyphs. The updated local system font not only can be used by web browsers, but also may be used by other stand-alone applications, such as personal word processor, email client, video player interface, etc.

Figure 3:
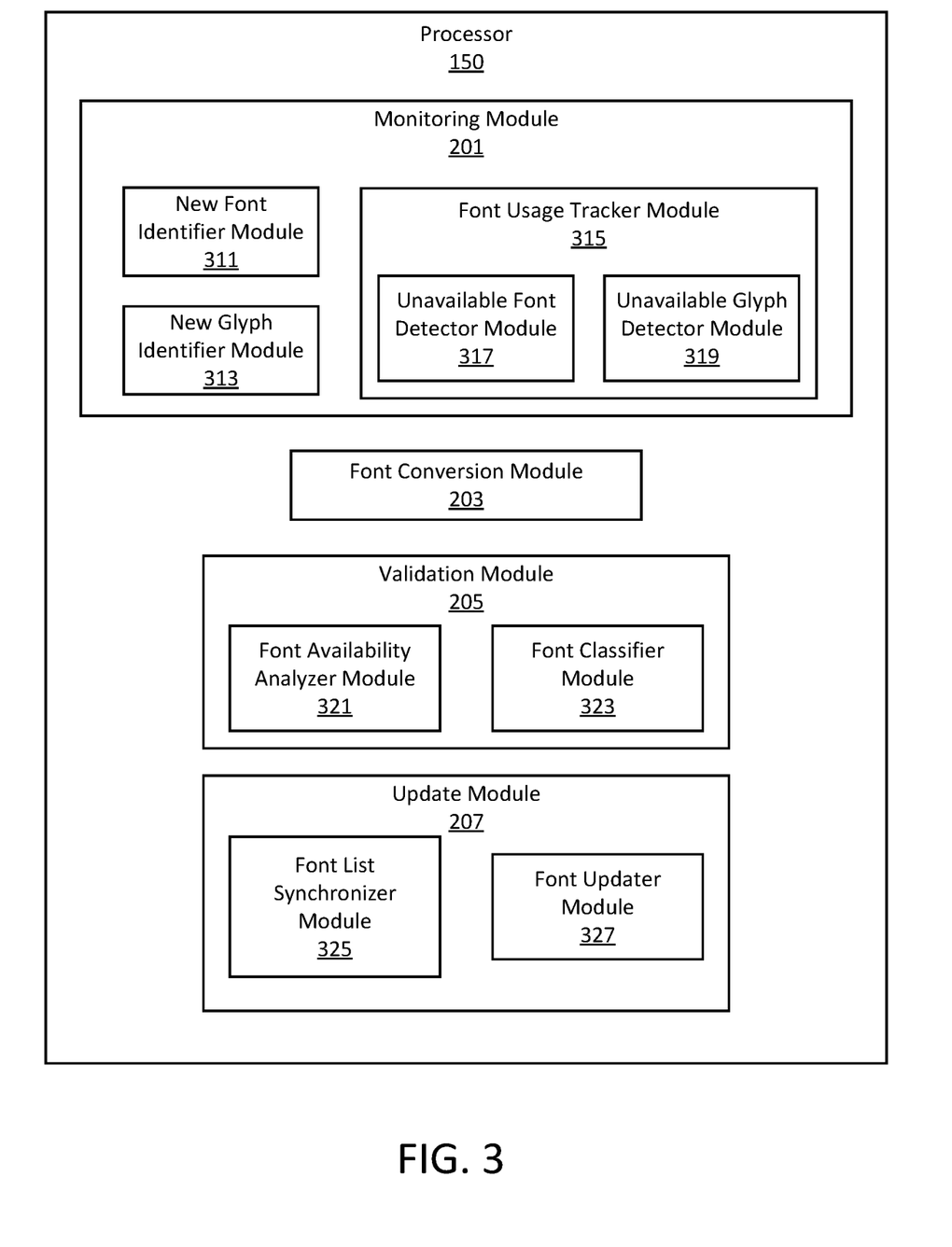
FIG. 3 is a block diagram of a further embodiment of a processor configured to provide cognitive font enrichment management for adding system fonts.

FIG. 3 is a block diagram illustrating a further embodiment of a processor 150 for providing cognitive font enrichment management for adding system fonts. The processor 150, in various embodiments, may be substantially similar to the processor 150 described above with regards to FIG. 2. In the depicted embodiment, the processor 450 may include a monitoring module 201, a font conversion module 203, a validation module 205, and an update module 207, which may be configured substantially similar as described above with regards to the monitoring module 201, the font conversion module 203, the validation module 205, and the update module 207 of FIG. 2. Additionally, the monitoring module 201 may include a new font identifier module 311, a new glyph identifier module 313, and a font usage tracker module 315. Further, the font usage tracker module 315 may include an unavailable font detector module 317 and an unavailable glyph detector module 319. Also, the validation module 205 may include a font availability analyzer module 321 and a font classifier module 323. Moreover, the update module 207 may include a font list synchronizer module 325 and a font updater module 327.

In certain embodiments, the new font identifier module 311 may identify a new web font which is not available in the local system font repository 109. For example, when the monitoring module 201 identifies a web font associated with a web site being displayed by a web application, the new font identifier module 311 may compare the web font with available fonts in an available font list. If the new font identifier module 311 fails to identify the web font in the locally maintained available font list, the new font identifier module 311 may determine that the web font is a new web font. In some embodiments, the new font identifier module 311, executed on the local system 101, may acquire an identifier for the web font. The new font identifier module 311 may compare the web font identifier against other identifiers in an available font list maintained in the local system 101. As stated above, if the new font identifier module 311 fails to find the web font identifier in the available font list, the new font identifier module 311 may determine that the web font is a new font.

In similar embodiments, the new glyph identifier module 313 may identify a new glyph that is not available in the local system font repository 109. For example, when the monitoring module 201 identifies a glyph associated with a web site being displayed by a web application, the new glyph identifier module 313 may compare the glyph with available glyphs in an available glyph list. If the new glyph identifier module 313 fails to identify the glyph in the locally maintained available glyph list, the new glyph identifier module 313 may determine that the glyph is a new glyph. In some embodiments, the new glyph identifier module 313, executed on the local system 101, may acquire an identifier for the font associated with the glyph and a character code for the glyph. The new glyph identifier module 313 may compare the identifier for the web font associated with the glyph and the identified character code against identifiers in an available font list and character identifiers in an available glyph list. As stated above, if the new glyph identifier module 313 fails to find either the web font identifier or the character code in the available font list and the available glyph list, the new glyph identifier module 313 may determine that the identified glyph is a new glyph.

In further embodiments, the font usage tracker module 315 may track the use of fonts by a user on a local system 101. For example, the font usage tracker module 315 may track the usage of fonts for the different applications that execute within the local system 101. Also, the font usage tracker module 315 may track the usage of fonts at the system level for the local system 101. Further, the font usage tracker module 315 may maintain a system font usage list, where the system font usage list keeps track of which fonts are used by the local system 101 and may also keep track of the frequency with which the various fonts are used. In some embodiments, the font usage tracker module 315 may make a font entry in the font usage list when an application attempts to load a font. For example, when an application attempts to load a font, the font usage tracker module 315 may store an identifier for the application and an identifier for the font within the font usage list.

In a similar manner, the font usage tracker module 315 may track the use of glyphs by a user on the local system 101. For example, the font usage tracker module 315 may track the usage of glyphs for the different applications that execute within the local system 101. Also, the font usage tracker module 315 may track the usage of glyphs at the system level for the local system 101. Further, the font usage tracker module 315 may keep track of which glyphs are used by the local system 101 and may also keep track of the frequency with which the various glyphs are used. In some embodiments, the font usage tracker module 315 may make a glyph entry in the font usage list when an application attempts to load a glyph, the font usage tracker module 315 may store an identifier for the application and an identifier for the glyph within the font usage list.

In additional embodiments, the unavailable font detector module 317 may detect when an application is unable to load a font that is unavailable in the local system font repository 109. For example, when the local system 101 attempts to load the font, the unavailable font detector module 317 may determine whether the application was able to load the font. To detect an unavailable font, the unavailable font detector module 317 may check a font identifier against a system font list. If the system font list fails to include the font identifier, the unavailable font detector module 317 may determine that the font is unavailable.

In certain embodiments, the unavailable glyph detector module 319 may detect when an application is unable to load a glyph that is unavailable in the local system font repository 109. For example, when the local system 101 attempts to load the font, the unavailable glyph detector module 319 may determine whether the application was able to load the glyph. To detect an unavailable glyph, the unavailable glyph detector module 319 may check a glyph identifier and an associated font ID to determine whether the font associated with the glyph and a glyph identifier are stored in the local system font repository 109. If the unavailable glyph detector module 319 determines that a particular glyph is not found within the local system font repository, the unavailable glyph detector module 319 may determine that the particular glyph is unavailable.

In some embodiments, the font availability analyzer module 321 may analyze the local system font repository 109 to identify available font information, such as fonts and glyphs. Further, when the font availability analyzer module 321 identifies a particular font within the local system font repository 109, the font availability analyzer module 321 may associate different fonts with one another based on font features. For example, the font availability analyzer module 321 may group fonts together based on typeface, where a typeface defines a visual appearance for a font. Additionally, the font availability analyzer module 321 may associate fonts with one another based on a font format, such as a file type (e.g. TrueType, PCF, AFM, PFA, etc.).

In further embodiments, when the font availability analyzer module 321 determines that a particular font or glyph is available, the font classifier module 323 may classify local system fonts into different groups based on font characteristics for the font. For example, the font classifier module 323 may identify the font characteristics such as the font features like typeface and format. Also, the font classifier module 323 may further identify styles for the font (e.g. monospace, proportional, script, serif, san-serif, bold, italicized, etc.). The font classifier module 323 may also identify the manner in which the fonts have been used both globally on the local system 101 and usage within specific applications executing on the local system 101. Additionally, the font classifier module 323 may determine the popularity of a particular font using metrics such as the usage frequency. Using the classification generated by the font classifier module 323, a local system 101 may be able to predict the type of fonts that are preferred by a user of a host device 103.

In some embodiments, the font list synchronizer module 325 may synchronize an available font list with a local system font repository 109. For example, when the font classifier module 323 classifies newly added fonts to the local system font repository 109, the font list synchronizer module 325 may synchronize the newly added fonts with other fonts saved in the local system font repository 109 based on similar font characteristics. Further, the font list synchronizer module 325 may identify fonts within the local system font repository 109 that are similar to unavailable fonts that applications were unable to load as identified by the unavailable font detector module 317 and the unavailable glyph detector module 319. The font list synchronizer module 325 may indicate which fonts are similar to one another within an available font list. The local system 101 may use the font information within the available font list to supply font information when the local system 101 identifies web information, where the web information calls for a web font that is unloadable by the local system 101. In a similar manner, the font list synchronizer module 325 may update glyphs within an available glyph list.

In additional embodiments, the font updater module 327 may update validated font information to the local system font repository 109. For example, the font updater module 327 may identify fonts that were validated by the validation module 205 and update the local system font repository 109 with the validated font information. In some embodiments, the font updater module 327 may provide an identifier for the validated font and identifier for a target font within the local system font repository 109. The font updater module 327 may then associate the identifier for the target font with the identifier for the validated font within the local system font repository 109. In a similar manner, the font updater module 327 may associate validated glyph identifiers with glyph identifiers within the target font within the local system font repository 109. Accordingly, information within the local system font repository 109 may be used to maintain an available font list for use when web fonts are unavailable or fonts are unavailable for use by an executing application.

In certain embodiments, when the font updater module 327 updates the local system font repository 109, the updated information may be provided to the font usage tracker module 315, which may provide the information to a CFEM manager that may store the updated information within a CFEM data structure 111. As used herein, the CFEM manager may provide a user interface for configuring and managing new fonts derived from web fonts. Further, the CFEM may provide font utility functions for controlling the fonts within the CFEM data structure 111. For example, the CFEM manager may allow a user to direct the detection of fonts and glyphs, the selection of specific fonts, the updating of fonts and glyphs, and the addition of fonts and glyphs, among other font related functions. Further, the local system 101 may store information within the CFEM data structure 111 that describes an identifier for the web font, a URL that produced the particular web font, alias names that may describe the web font, suggested system fonts, and applications that are able to load the font and/or the suggested system fonts.

Figure 4:
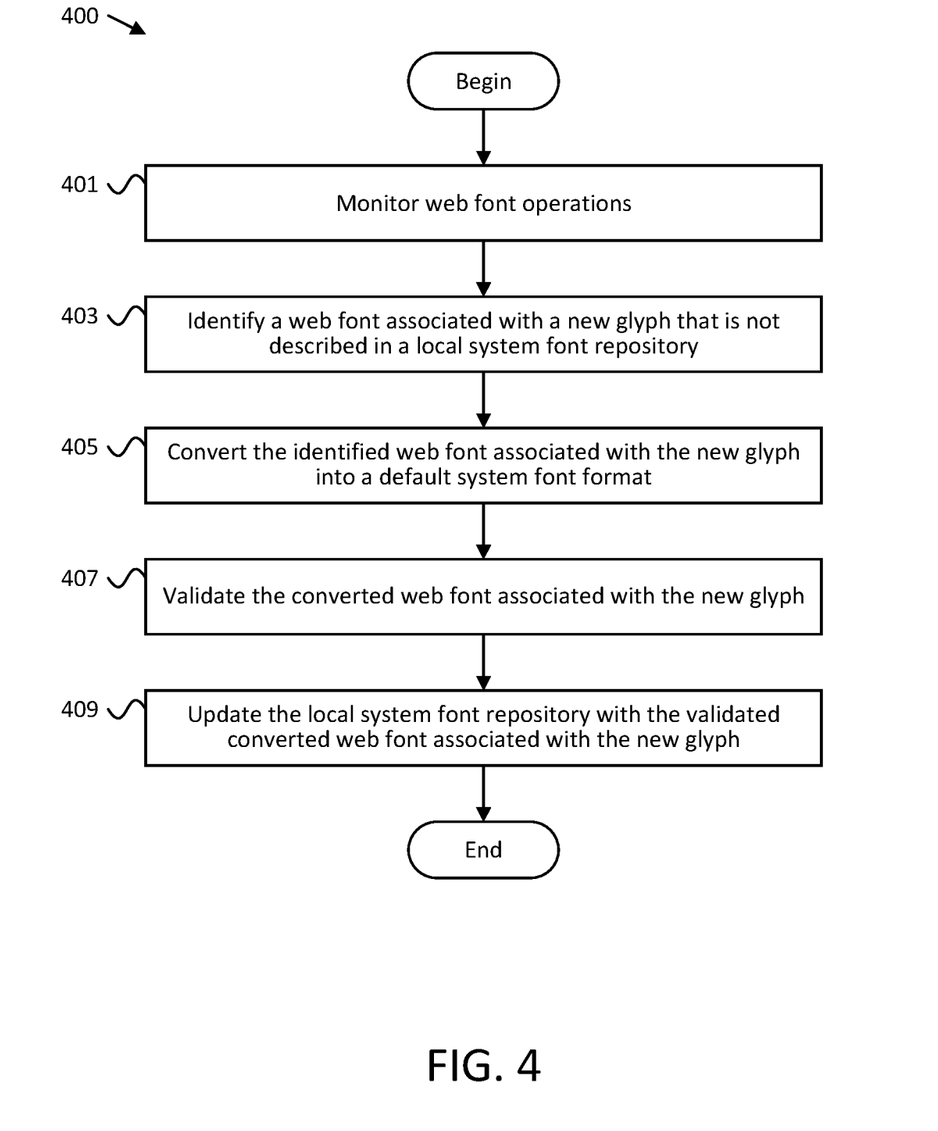
FIG. 4 is a flowchart diagram illustrating one embodiment of a method for providing cognitive font enrichment management for adding system fonts.

FIG. 4 is a flow chart diagram illustrating a further embodiment of a method 400 for providing cognitive font enrichment management for adding system fonts. In certain embodiments, the method 400 proceeds at 401 where web font operations are monitored. Further, the method 400 proceeds at 403 where a web font is identified that is not described in a local system font repository 109. Additionally, the method 400 proceeds at 405 where the identified web font is converted into a default system font format. Also, the method 400 proceeds at 407 where the converted web font is validated. Furthermore, the method 400 proceeds at 409 where the local system font repository 109 is updated with the validated converted web font.

Figure 5:
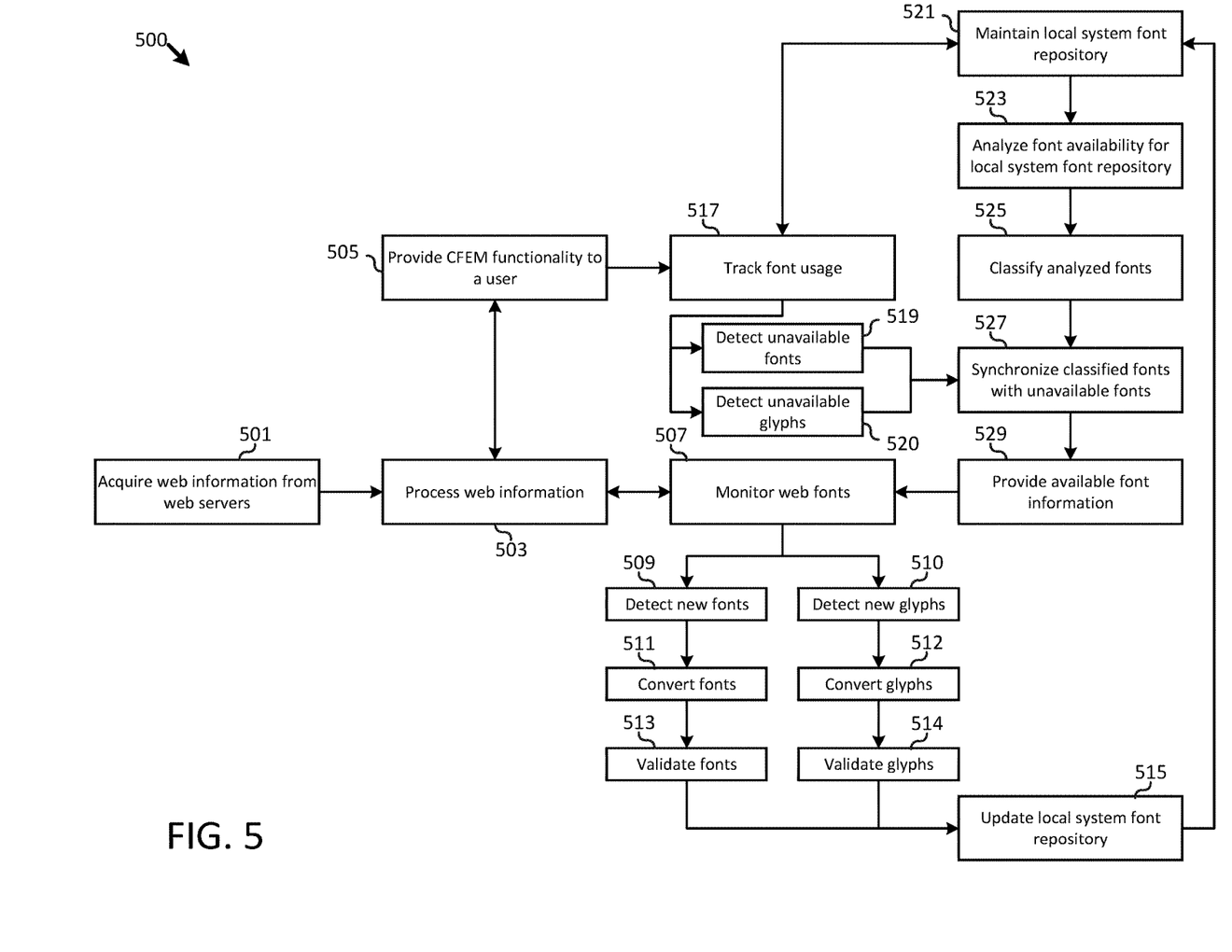
FIG. 5 is a flowchart diagram illustrating an embodiment of a further method for providing cognitive font enrichment management for adding system fonts.

FIG. 5 is a flowchart diagram illustrating an embodiment of a method 500 for providing a CFEM framework for proactively adding new fonts to a local system font repository 109 from web fonts identified in web information received from a web server. In some embodiments, method 500 may proceed at 501 where web information is acquired from one or more web servers. For example, a local system 101 may receive web information from a web server 120 through an internet connection 125. Upon receiving the web information, the method 500 may proceed at 503 where the web information is processed. In some examples, the acquired web information may be provided to a processor 150 that subsequently processes the acquired web information.

In certain embodiments, the method 500 may proceed at 507, where web fonts are monitored. For example, when processing the acquired web information, the processor 150 may identify information that describes web fonts within the acquired web information. Further, when identifying information that describes web fonts, the processor 150 may acquire available font information. Additionally, the method 500 may proceed at 509 and 510, where new fonts and new glyphs are detected. In some examples, when the web fonts are identified, the processor 150 may determine which web fonts are new by comparing web fonts detected in the web information with fonts identified in an available font list. Detected web fonts that are not identified in the available font list may be designated as new fonts. Also, when new glyphs are detected, the processor 150 may also detect glyphs that are not identified within an available glyph list.

In some embodiments, the method 500 may proceed at 511 and 512, where new fonts and glyphs are converted. For example, the processor 150 may convert the detected new font into a default system font. The processor 150 may also convert detected new glyphs that have been converted into system glyphs. When the new font is converted, the method 500 may proceed at 513 and 514, where fonts and glyphs are validated. In some examples, the processor 150 may validate the converted font to verify that the converted font can be loaded and used by the local system 101 and/or local applications that may attempt to load the converted font. Also, the processor 150 may validate the converted glyphs to verify that the glyphs can be loaded and used by the local system 101 and/or local applications that may attempt to load the converted glyphs. In further embodiments, when the font is validated, the method 500 may proceed at 515, where the local system font repository 109 is updated. For example, the validated fonts and glyphs may be saved in the local system font repository 109, where the local system font repository 109 indicates the fonts that are stored on the local system 101.

In additional embodiments, when the processor 150 processes web information at 503, the method 500 may also proceed at 505, where CFEM functionality is provided to a user. For example, the local system 101 may provide a CFEM data structure 111 while providing CFEM managerial functionality to a user. As described above, the local system may use information stored within the CFEM data structure 111 to track the usage of web fonts. In one particular embodiment, the local system 101 may store the information at either the application level or the system level. Using the data in the CFEM data structure 111, the local system 101 may provide CFEM managerial functionality to a user, where the CFEM managerial functionality may permit a user to analyze detected fonts and glyphs, the selection of fonts, the updating of fonts, the addition of fonts to the CFEM data structure 111, and the like.

In further embodiments, when the CFEM functionality is provided to a user, the method 500 may proceed at 517, where font usage is tracked. For example, the processor 150 may identify the fonts that are loaded by a particular application. Also, the processor 150 may track the usage of fonts by the local system 101. In some embodiments, when the font usage is being tracked, the method 500 may proceed at 521, where a local system font repository 109 is maintained. For example, information stored in the local system font repository 109 may be used to track the font usage by the local system 101 and applications that execute on the local system 101. Also, the processor 150 may update information in the local system font repository 109 based on information gathered during the tracking of font usage by the local system 101 and applications that execute on the local system 101.

In certain embodiments, while the font usage is being tracked, the method 500 proceeds at 519 and 520, where unavailable fonts and glyphs are detected. For example, the processor 150 may use information in the local system font repository 109 to identify which fonts are not available. Also, the processor 150 may detect which fonts were unloadable by applications executing on the local system 101. In a similar manner, the processor 150 may also detect unavailable glyphs.

In further embodiments, while the font usage is being tracked, the method 500 may also perform 523 and 525. When the method proceeds at 523, font availability for the local system font repository 109 is analyzed. For example, the processor 150 may identify the various fonts and glyphs that are stored in the local system font repository 109. Further, for the fonts and glyphs stored in the local system font repository 109, the processor 150 may also acquire and/or determine various characteristics for the fonts and glyphs stored in the local system font repository 109. When the fonts of the local system font repository 109 are analyzed, the method 500 may proceed at 525, where the analyzed fonts are classified. For example, the processor 150 may classify the different fonts based on the determined characteristics for the various fonts in the local system font repository 109. When the fonts are classified, the method 500 proceeds at 527, where classified fonts are synchronized with unavailable fonts. For example, the processor 150 may synchronize the classified font information and the information regarding the detected unavailable fonts to create an available font list. Further, the processor 150 may synchronize classified glyph information and information regarding detected unavailable glyphs to create an available glyph list. When the available font list and available glyph list are created, the method 500 may proceed at 529, where the available font information is provided to aid in the monitoring of web fonts. The processor 150 may use the available font information, to determine when a web font is a new web font.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A system, comprising:
 a monitoring module that:
  maintains a web font list of different known system font formats included in a local system font repository,
  monitors web information received from a web server to identify each web font included in the web information,
  receives, from the web server, new web information from a website comprising a new glyph that includes a web font associated with the new glyph,
  independently and unilaterally determines whether the web font associated with the new glyph in the received new web information is a known web font by comparing the web font associated with the new glyph in the received new web information and each known system font format in the web font list of different known system font formats to determine whether a set of first characteristics of the web font associated with the new glyph matches a set of second characteristics of one or more known system font formats in the web font of known system font formats,
  in response to the set of first characteristics of the web font associated with the new glyph not matching the set of second characteristics of any known system font format in the web font list of different known web fonts, independently and unilaterally identifies the web font associated with the new glyph as an unknown web font,
  compares the set of first characteristics of the unknown web font to the set of second characteristics for each different known system font format in the web font list of different known system font formats included in the local system font repository to independently and unilaterally determine which known system font format is most similar to the unknown web format,
  independently and unilaterally selects, as a new default system font format for the unknown web font, the known system font format in the web font list of different system font formats that includes the set of second characteristics that are the most similar to the set of first characteristics of the unknown web font, and
  in response to the selection, independently and unilaterally changing a current default system font format for the website to the new default system font format for the unknown web font;
 a font conversion module that converts the unknown web font associated with the new glyph into the new default system font format;
 a validation module that validates the converted unknown web font associated with the new glyph; and
 an update module that updates the web font list of different known system font formats in the local system font repository with the validated converted unknown web font associated with the new glyph,
 wherein at least a portion of each of said modules comprises one or more of a set of hardware circuits, a set of programmable hardware devices, and executable code stored on a set of non-transitory computer-readable storage media.

2. The system of claim 1, wherein the unknown web font comprises font information that describes one or more fonts or one or more glyphs.

3. The system of claim 1, wherein the monitoring module further comprises a font usage tracker module that tracks the use of fonts by a user.

4. The system of claim 3, wherein the font usage tracker module tracks the use of fonts at a system level and an application level.

5. The system of claim 3, wherein the font usage tracker module detects unavailable fonts associated with unavailable glyphs, wherein an unavailable font includes a local system font that is unloadable by an application.

6. The system of claim 1, wherein the validation module comprises a font availability analyzer module that analyzes an availability of local system font information within the local system font repository.

7. The system of claim 1, wherein the validation module comprises a font classifier module that classifies font information into one or more groups based on characteristics of the font information.

8. The system of claim 1, wherein the update module comprises a font list synchronizer module that synchronizes font information in the local system font repository with an available font list.

9. The system of claim 1, further comprising a cognitive font enrichment manager data structure for monitoring one or more web fonts.

10. A method, comprising:
monitoring, by a processor, web information received from a web server to identify each web font included in the web information;
maintaining, by the processor, a web font list of different known system font formats included in a local system font repository;
receiving, by the processor from the web server, new web information from a website comprising a new glyph that includes a web font associated with the new glyph,
independently and unilaterally determining, by the processor, whether the web font associated with the new glyph in the received new web information is a known web font by comparing the web font associated with the new glyph in the received new web information and each known system font format in the web font list of different known system font formats to determine whether a set of first characteristics of the web font associated with the new glyph matches a set of second characteristics of one or more known system font formats in the web font list of known system font formats;
in response to the set of first characteristics of the web font associated with the new glyph not matching the set of second characteristics of any known system font format in the web font list of different known web fonts, independently and unilaterally identifying, by the processor, the web font associated with the new glyph as an unknown web font;
comparing, by the processor, the set of first characteristics of the unknown web font to the set of second characteristics for each different known system font format in the web font list of different known system font formats included in the local system font repository to independently and unilaterally determine which known system font format is most similar to the unknown web format;
independently and unilaterally selecting, by the processor, as a new default system font format for the unknown web font, the known system font format in the web font list of different system font formats that includes the set of second characteristics that are the most similar to the set of first characteristics of the unknown web font;
in response to the selection, independently and unilaterally changing, by the processor, a current default system font format for the website to the new default system font format for the unknown web font;
converting, by the processor, the unknown web font associated with the new glyph into the new default system font format;
validating, by the processor, the converted unknown web font associated with the new glyph; and
updating, by the processor, the web font list of different known system font formats in the local system font repository with the validated converted unknown web font associated with the new glyph.

11. The method of claim 10, wherein the unknown web font comprises font information that describes one or more fonts or one or more glyphs.

12. The method of claim 10, wherein monitoring web font operations further comprises tracking the use of fonts by a user.

13. The method of claim 12, wherein tracking the use of fonts further comprises tracking the use of fonts at a system level and an application level.

14. The method of claim 12, wherein tracking the use of fonts further comprises detecting unavailable fonts associated with unavailable glyphs, wherein an unavailable font includes a local system font that is unloadable by an application.

15. The method of claim 10, wherein validating the converted web font further comprises analyzing an availability of local system font information within the local system font repository.

16. The method of claim 10, wherein validating the converted web font further comprises classifying font information into one or more groups based on characteristics of the font information.

17. The method of claim 10, wherein updating the local system font repository further comprises synchronizing font information in the local system font repository with an available font list.

18. The method of claim 10, further comprising monitoring one or more web fonts with a cognitive font enrichment manager data structure.

19. A computer program product comprising a computer-readable storage medium including program instructions embodied therewith, the program instructions executable by a processor to cause the processor to:
maintain a web font list of different known system font formats included in a local system font repository;
monitor web information received from a web server to identify each web font included in the web information;
receive, from the web server, new web information from a website comprising a new glyph that includes a web font associated with the new glyph,
independently and unilaterally determine whether the web font associated with the new glyph in the received new web information is a known web font by comparing the web font associated with the new glyph in the received new web information and each known system font format in the web font list of different known system font formats to determine whether a set of first characteristics of the web font associated with the new glyph matches a set of second characteristics of one or more known system font formats in the web font list of known system font formats;
in response to the set of first characteristics of the web font associated with the new glyph not matching the set of second characteristics of any known system font format in the web font list of different known web fonts, independently and unilaterally identify the web font associated with the new glyph as an unknown web font;
compare the set of first characteristics of the unknown web font to the set of second characteristics for each different known system font format in the web font list of different known system font formats included in the local system font repository to independently and unilaterally determine which known system font format is most similar to the unknown web format;
independently and unilaterally select, as a new default system font format for the unknown web font, the known system font format in the web font list of different system font formats that includes the set of second characteristics that are the most similar to the set of first characteristics of the unknown web font;

in response to the selection, independently and unilaterally change a current default system font format for the website to the new default system font format for the unknown web font;

convert the unknown web font associated with the new glyph into the new default system font format;

validate the converted unknown web font associated with the new glyph; and update the web font list of different known system font formats in the local system font repository with the validated converted unknown web font associated with the new glyph.

20. The computer program product of claim 19, wherein the program instructions executable by a processor further cause the processor to:

track the use of fonts by a user at a system level and an application level; and detect unavailable fonts associated with unavailable glyphs, wherein an unavailable font includes a local system font that is unloadable by an application.

\* \* \* \* \*